United States Patent
Wolfe, Jr.

[11] 3,727,774
[45] Apr. 17, 1973

[54] LIFT TRUCK
[75] Inventor: Maston B. Wolfe, Jr., Dallas, Tex.
[73] Assignee: Standard Manufacturing Company Incorporated, Dallas, Tex.
[22] Filed: Sept. 1, 1970
[21] Appl. No.: 68,679

[52] U.S. Cl............214/1 D, 180/66 R, 214/130 R
[51] Int. Cl.............................................B66c 23/56
[58] Field of Search................214/1 R, 1 D, 140; 180/66 R

[56] References Cited

UNITED STATES PATENTS

| | | | |
|---|---|---|---|
| 3,024,933 | 3/1962 | Albert et al. | 214/770 X |
| 3,303,901 | 2/1967 | Schou | 180/66 R X |
| 3,484,004 | 12/1969 | Hughey | 214/130 |
| 3,087,630 | 4/1963 | Karnow et al. | 214/1 CM X |
| 3,005,562 | 10/1961 | Shaffer | 180/66 R X |
| 2,833,362 | 5/1958 | Martin | 180/66 R |
| 3,484,964 | 12/1969 | Jeffery, Jr. | 180/66 R X |
| 2,613,822 | 10/1952 | Stanley | 214/1 D |

FOREIGN PATENTS OR APPLICATIONS

| | | | |
|---|---|---|---|
| 653,079 | 4/1936 | Germany | 214/1 D |

*Primary Examiner*—Gerald M. Forlenza
*Assistant Examiner*—Frank E. Werner
*Attorney*—Richards, Harris & Hubbard

[57] ABSTRACT

A lift truck includes a rear engine, a hydrostatic drive unit mounted just forward of the engine, and an article lifting mechanism mounted just forward of the hydrostatic drive unit. The engine drives the hydrostatic drive unit, and the hydrostatic drive unit propels the lift truck through a pair of rear wheels. The lift truck is guided by a steering mechanism that manipulates a pair of front wheels. An operating compartment is positioned over the hydrostatic drive unit and includes controls for the hydrostatic drive unit, the lifting mechanism and the steering mechanism.

13 Claims, 3 Drawing Figures

LIFT TRUCK

This invention relates to a lift truck, and more particularly to a lift truck especially adapted for use in the loading of aerial weapons.

In the field of aerial weaponry, weapons such as bombs, rockets and the like are secured to aircraft by the interengagement of lugs on the weapons and attaching members on the aircraft. Although aerial weapons frequently weight as much as several tons, they must be positioned very accurately relative to an aircraft before their lugs can mate with the attaching members on the aircraft. For this reason, aerial wepons are usually mounted on aircraft by means of lift tables mounted on lift trucks.

Heretofore, lift trucks suitable for use in aerial weapon loading operations have been extremely complicated devices. For example, typical prior art lift trucks include three gear boxes, a clutch, a transmission and a differential. Also, prior lift trucks have lacked sufficient maneuverability to permit the accurate positioning necessary in aerial weapon loading operations by means of the lift truck alone. One factor underlying this lack of maneuverability is believed to involve the use of the rear wheels of prior lift trucks both to propel and to steer such vehicles.

The lack of maneuverability that has characterized prior lift trucks has necessitated the use of highly complicated lift tables in aerial weapon loading operations. Prior lift trucks have typically provided only one of the motions needed in such an operation, e.g., linear motion in the vertical direction. Thus it has heretofore been necessary to provide lift tables cable of providing the remaining motions necessary to effect the positioning of a weapon. With respect to linear movement in mutually perpendicular horizontal directions, the lift tables employed heretofore in the loading of aerial weapons have utilize hydraulic cylinders or manually operated rack and pinion or lead screw mechanisms to provide the necessary motions. All of these mechanisms are both expensive to manufacture and relatively slow in operation.

The present invention relates to a novel lift truck including a rear engine, a hydrostatic drive unit positioned forward of the engine and a weapon lifting assembly positioned forward of the hydrostatic drive unit. The vehicle is steered through its front wheels and is controlled from an operating compartment located over the hydrostatic drive unit. The lift truck is so highly maneuverable that all of the linear motions that are necessary in an aerial weapon loading operation are provided by the truck. Thus, the use of the invention permits the use of considerably less complicated lift tables than has been possible heretofore.

The use of the present invention results in several advantages in addition to increased maneuverability. For example, since the operating compartment is located over the hydrostatic drive unit, the operator of a lift truck employing the invention is perfectly centered and is located forward of the position of the operator of a typical prior art lift truck. Thus, the operator is in a better position to control the operation of the lift truck in a weapon loading operation. Furthermore, the use of the hydrostatic drive unit in the present lift truck reduces the overall length of the truck by as much as 18 inches. This is of considerable importance in lift trucks intended for use in the vicinity of aircraft, since it reduces the chance of interference between the lift truck and the component parts of an aircraft.

A more complete understanding of the present invention may be had by referring to the following Detailed Description when taken in conjunction with the drawings, wherein.

Figure 1:
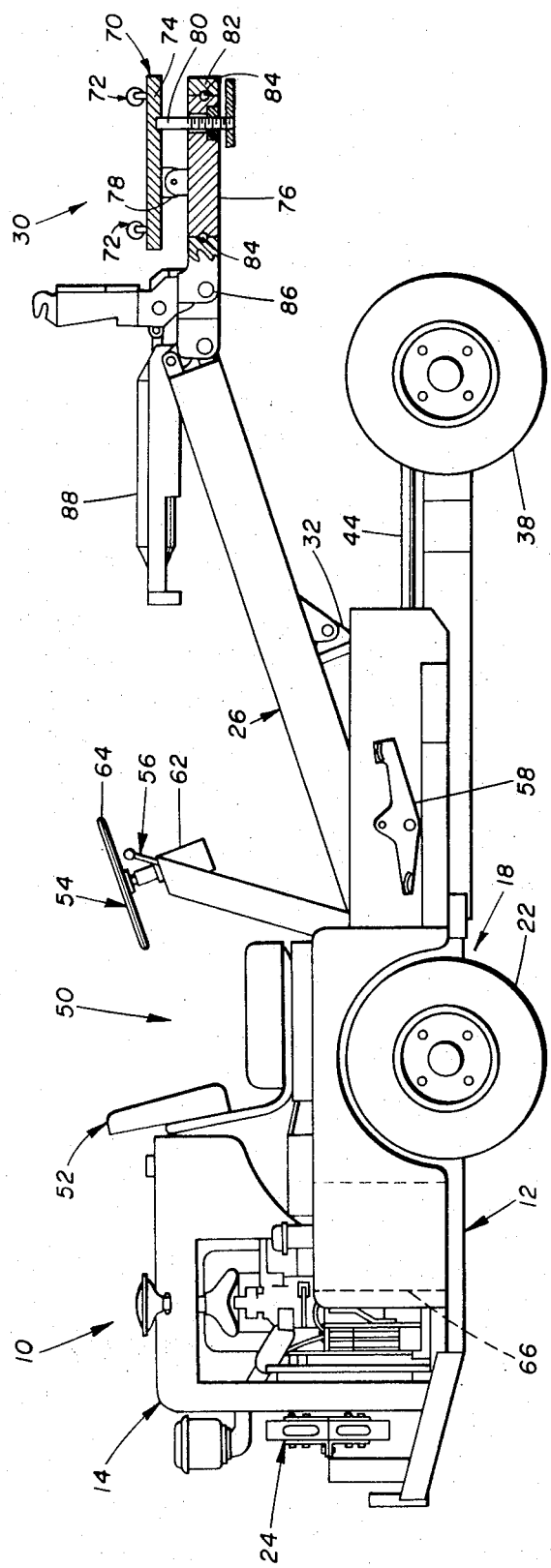
FIG. 1 is a side view of a lift truck employing the invention.

Referring now to the drawings, a lift truck 10 employing the present invention is shown. The lift truck 10 includes a frame 12 which extends the length of the lift truck 10 and which supports the various component parts thereof. The lift truck 10 further includes a rear engine 14, which preferably is a self-contained unit of the type manufactured by the Wisconsin Motor Corporation of Milwaukee, Wisonsin, and identified by that company as Model TJD.

Figure 3:
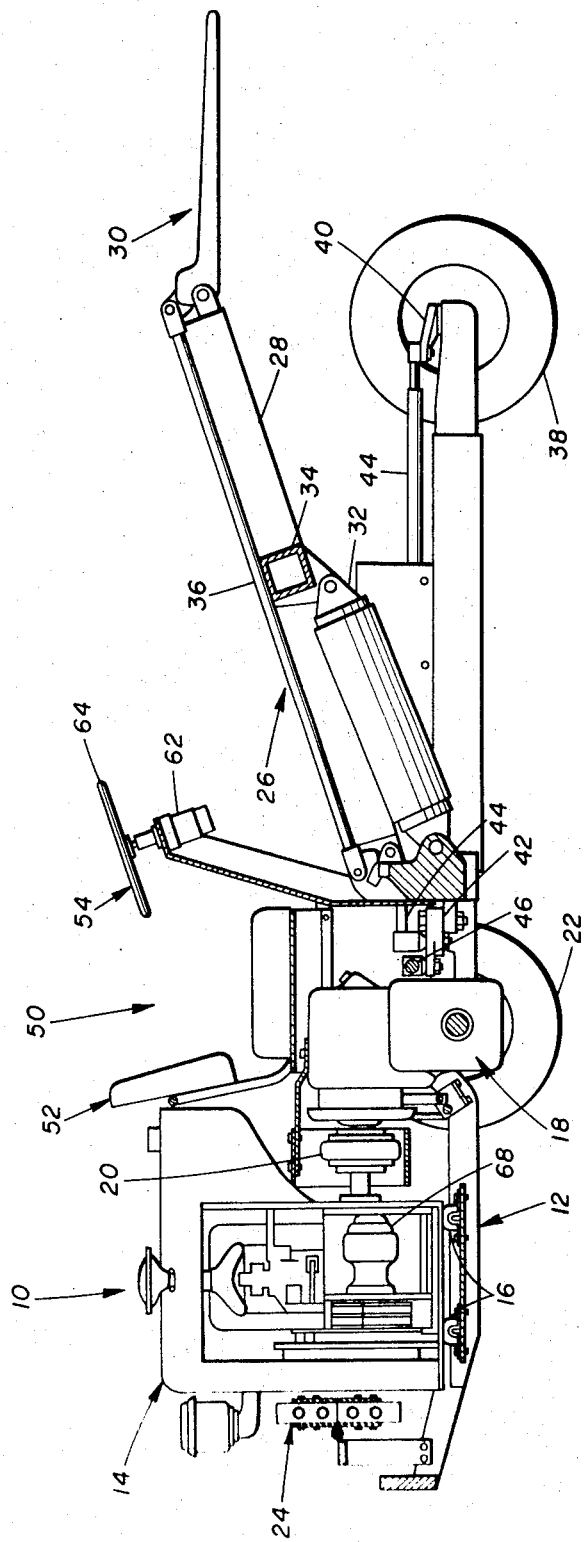
FIG. 3 is a longitudinal sectional view of the lift truck shown in FIG. 1.

As is best shown in FIG. 3, the engine 14 is supported on the frame 12 by a plurality of shock mounts 16. The output of the engine 14 is coupled to a hydrostatic drive unit 18 mounted just forward of the engine 14 through a conventional flexible coupling 20. The hydrostatic drive unit 18 is preferably of the type manufactured by Eaton, Yale and Towne, Inc., Eaton Marshall Division, of Marshall, Michigan and identified by that company as Model 12, and operates to propel the lft truck 10 through a pair of rear drive wheels 22. During the operation of the hydrostatic drive unit 18, the operating temperature thereof is regulated by directing hydraulic fluid from the hydrostatic drive unit through a heat exchanger 24 located at the rear of the engine 14.

The lift truck 10 further includes an article lifting mechanism 26 which is supported on the frame 12 just forward of the hydrostatic drive unit 18. The mechanism 26 includes a pair of booms 28 which are pivotally connected to the frame 12 and which extend to an article receiving and supporting assembly 30. A hydraulic cylinder 32 is connected between the frame 12 and a cross beam 34 extending between the booms 28. During the operation of the lift truck 10, the hydraulic cylinder 32 is actuated to raise and lower the article receiving and supporting assembly 30 relative to the frame 12. During this action, a pair of tension rods 36 cooperate with the booms 28 to control the orientation of the assembly 30.

Figure 2:
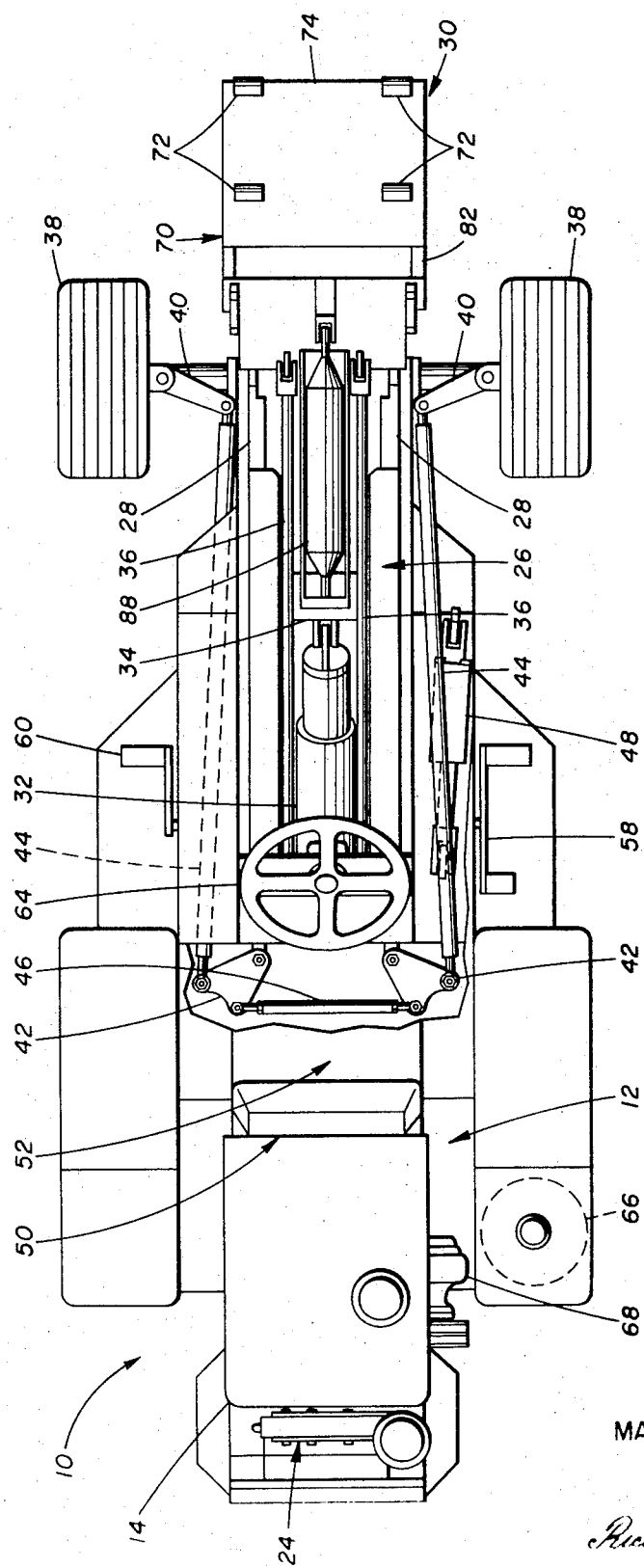
FIG. 2 is a top view of the lift truck shown in FIG. 1 in which certain parts have been broken away more clearly to illustrate certain features of the invention.

Steering for the lift truck 10 is provided through a pair of front steering wheels 38. As is best shown in FIG. 2, the wheels 38 are pivotally supported on the frame 12 by a pair of bell cranks 40. The bell cranks 40 are connected to a pair of bell cranks 42 by a pair of trailing arms 44, and the bell cranks 42 are interconnected by a cross arm 46. A hydraulic cylinder 48 is connected between the frame 12 and one of the trailing arms 44 to control the orientation of the wheels 38.

Referring now to FIG. 1, an operating compartment 50 for the lift truck 10 is positioned over the hydrostatic drive unit 18 between the engine 14 and the article lifting mechanism 26. The operating compartment 50 includes a seat 52 mounted on the center line of the lift truck 10, a steering control assembly 54 and a lifting mechanism control assembly 56. As is best shown in FIG. 2, the operating compartment 50 further includes a pair of foot pedals 58 and 60 which are supported on opposite sides of the lift truck 10. The foot pedal 58 operates through the hydrostatic drive unit 18 to control both the direction and the speed of the lift truck 10. The foot pedal 60 operates a disk brake mounted on a shaft which extends from the hydrostatic drive unit 18.

Referring again to FIG. 1, the steering control assembly 54 includes a steering control device 62 and a steering wheel 64 which controls the operation of the device 62. The device 62 is preferably of the type manufactured by the Char-Lyn Company of Minneapolis, Minneapolis and identified by that company as Model UBA. In use, the steering control device 62 controls the steering of the lift truck 10 by controlling the flow of hydraulic fluid from the charge pump of the hydrostatic drive unit 18 to the hydraulic cylinder 48.

The lifting mechanism control assembly 56 comprises a valve that controls the flow of hydraulic fluid to and from the article lifting mechanism 26. That is, the lifting mechanism control assembly 56 controls the flow of hydraulic fluid between the hydraulic cylinder 32 and a hydraulic fluid storage tank 66 mounted adjacent the engine 14. During lifting operations, hydraulic fluid is forced from the tank 66 into the cylinder 32 by a pump 68 that is driven by the engine 14.

The article receiving and supporting assembly 30 of the lift truck 10 may comprise any desired construction. For example, as shown in FIG. 3, the assembly 30 may comprise a pair of conventional lift forks. Alternatively, as is shown in FIGS. 1 and 2, the assembly 30 may comprise a lift table adapted to to align the lugs of aerial weapons with the attaching members of an aircraft. In the latter case, the assembly 30 is preferably constructed in accordance with the disclosure of the co-pending application entitled "LIFT TABLE" filed by Maston B. Wolfe, Jr. on Aug. 5, 1970, Serial Number 61,230.

The combination of the present lift truck and the lift table disclosed in the above-identified Wolfe application is particularly useful in aligning the lugs of aerial weapons with the attaching members of an aircraft. It has been found that the construction of the lift truck 10 provides such accurate control over the positioning of the article receiving and supporting assembly 30 that the need for horizontal positioning mechanisms in the assembly 30 is eliminated. Instead, the lift truck 10 is driven toward the attaching members of an aircraft at an angle of about 45°, and the wheels 38 of the lift truck 10 are manipulated to effect the final horizontal positioning of an aerial weapon supported on the article receiving and supporting assembly 30.

The elimination of the need for lateral positioning permits the use of relatively uncomplicated lift tables in conjunction with the lift truck 10. For example, the article receiving and supporting assembly 30 shown in FIGS. 1 and 2 comprises a lift table 70 including a plurality of rollers 72 which support an aerial weapon for rotation about an axis extending longitudinally through the weapon. The rollers 72 are supported on a plate 74 which is in turn supported for tilting move-ment relative to a plate 76 by a pair of hinges 78 and a screw 80. The plate 76 is supported on a main frame 82 by a plurality of ball bearings 84 and is therefore adapted to rotation about a vertical axis.

The main frame 82 of the lift table 70 is supported for rotation about a pivot point 86 under the action of a hydraulic cylinder 88. As is fully disclosed in the above-identified Wolfe application, this pivoting motion is provided primarily to facilitate the loading of aerial weapons onto the lift table 70. It has been found, however, that the tilting of the main frame 82 also accommodates the pivoting of an aerial weapon supported on rollers 72 about the pivot point 86. Thus, the lift table 70 is comprised solely of tilting and rotating mechanisms, and does not include the horizontal adjusting mechanisms that have characterized prior lift tables.

The use of the present invention in the construction of a lift truck results in several advantages over the prior art. For example, as opposed to a conventional lift truck of similar capacity, the use of a hydrostatic drvve unit eliminates three gear boxes, a clutch, a transmission and a differential. Overall, the use of the present invention results in the elimination of approximately 50% of the components and approximately 80% of the hydraulic lines comprising a typical prior art lift truck. This reduction in number of parts and complexity of design in turn results in a lift truck that is both considerably cheaper to build and considerably easier to maintain.

The construction of a lift truck in accordance with the present invention is advantageous for reasons in addition to simplicity of construction. For example, the operator of such a lift truck is perfectly centered, and is positioned forward of the engine. this permits greater control over the operation of the lift truck than is possible in prior lift trucks. Furthermore, the present lift truck is between 12 inches and 18 inches shorter than comparable prior lift trucks. It is believed obvious that whenever a vehicle is used in the vicinity of aircraft, any reduction in length results both in a considerable increase of maneuverability and in a considerable reduction in the chance of interference between the lift truck and the component parts of an aircraft.

Still another advantage that results from the use of the present invention is improved creep characteristics. Creep is the ability to move either forward or backward very, very slowly, and is very important to the successful loading of aerial weapons. It has been found that lift trucks employing the present invention perform better in the creep mode than prior lift trucks, especially when changing from creep in one direction to creep in the other direction, as is often required. The latter function is accomplished in lift trucks employing the present invention very quickly, and without changing gears.

Although the lift truck shown in the drawings comprises the preferred embodiment of the present invention, it will be understood that numerous other embodiments can be employed in the practice of the invention. For example, instead of the article receiving and supporting assemblies shown, a conventional forklift mast can be mounted on the end of the article lifting mechanism. Still another embodiment of the invention comprises a fork lift mask mounted on a base that is supported on rails extending from a point located adjacent the operating compartment to a point located between the front wheels of the lift truck. In accordance with still other embodiments of the invention, the article receiving and supporting assembly may comprise brick handling equipment, mortar or concrete delivery equipment, etc.

Although specific embodiments of the invention are illustrated in the drawings and described herein, it will be understood that the invention is not limited to the embodiments disclosed but is capable of rearrangement, modification and substitution of parts and elements without departing from the spirit of the invention.

What is claimed is:

1. In a lift truck, the combination of:
   a frame including a forward U-shaped portion comprising a pair of substantially parallel, longitudinally extending arms and a transversely extending base interconnecting the rear ends of the arms;
   a prime mover mounted on the frame to the rear of the U-shaped portion thereof;
   transmission means mounted on the frame in the space between the prime mover and the base of the U-shaped portion of the frame and operatively connected to the prime mover;
   a pair of non-steerable drive wheels positioned on opposite sides of the transmission means for supporting the rear end of the lift truck on a surface and operatively connected to the transmission means and hence to the prime mover for actuation thereby to propel the lift truck over the surface;
   a pair of non-driven steering wheels mounted at the front ends of the arms of the U-shaped portion of the frame to support the front end of the lift truck on the surface,
   said steering wheels being independently supported on the arms to define an entirely open area extending upwardly from the surface between the arms and between the steering wheels;
   a boom pivotally supported on the base of the U-shaped portion of the frame for manipulation within said open area;
   article receiving and supporting means mounted on the distal end of the boom; and
   an operating compartment positioned on the frame to the rear of the base of the U-shaped portion thereof and including means for controlling the orientation of the front steering.

2. The lift truck according to claim 1 wherein the prime mover comprises an internal combustion engine and the transmission means comprises a hydrostatic drive unit interconnecting the engine and the rear drive wheels and substantially filling the space between the engine and the base of the U-shaped portion of the frame.

3. The lift truck according to claim 1 further including at least one hydraulic pump driven by the prime mover and at least one hydraulic cylinder connected between the frame and the boom for manipulating the boom within the open area between the arms of the U-shaped portion of the frame and the steering wheels mounted thereon.

4. The lift truck according to claim 1 further comprising:
   hydraulic pump means driven by the prime mover;
   a linkage including first bell crank means pivotally supported at the front ends of the arms of the U-shaped portion of the frame and in turn supporting the front steering wheels, a pair of first tie rods having front ends connected to the first bell crank means and extending rearwardly therefrom along the arms of the U-shaped portion of the frame, second bell crank means pivotally supported on the frame and connected to the rear ends of the first tie rods, and a second tie rod extending along the base of the U-shaped portion of the frame and interconnecting the second bell crank means;
   at least one hydraulic cylinder for actuating the linkage to control the orientation of the front steering wheels; and
   valve means operable from within the operating compartment of the lift truck to control the flow of hydraulic fluid from the hydraulic pump means to the hydraulic cylinder and thereby controlling the orientation of the front steering wheels.

5. A lift truck comprising:
   a frame having a pair of substantially parallel arms extending from its front end to define an entirely open area therebetween;
   a pair of steering wheels mounted on the front ends of the arms of the frame to support the front end of the lift truck;
   a boom pivotally supported on the frame for manipulation in the open area between the arms thereof;
   an engine supported at the extreme rear end of the frame;
   hydrostatic drive means operatively connected to the engine and occupying substantially the entire space between the front of the engine and the pivotal connection of the boom to the frame whereby the overall length of the lift truck is minimized;
   a pair of rear drive wheels positioned on opposite sides of the hydrostatic drive means and operatively connected to the hydrostatic drive means and hence to the engine for operation thereby to propel the lift truck; and
   an operating compartment positioned over the hydrostatic drive means and including means for controlling the orientation of the front steering wheels.

6. The lift truck according to claim 5 further comprising:
   hydraulic pump means driven by the engine;
   a linkage connected to the front steering wheels and extending rearwardly along the arms of the frame and then transversely across the frame for constraining the steering wheels to substantially identical angular relationships with respect to the frame;
   hydraulic cylinder means connected to the linkage for controlling the orientation of the steering wheels relative to the frame; and
   valve means mounted in the operating compartment for controlling the flow of hydraulic fluid from the hydraulic pump means to the hydraulic cylinder means and thereby controlling the orientation of the steering wheels.

7. The lift truck according to claim 5 further including:
   hydraulic pump means driven by the engine;

hydraulic cylinder means connected between the frame and the boom; and valve means mounted on the operating compartment for controlling the flow of hydraulic fluid between the hydraulic pump means and the hydraulic cylinder means and thereby controlling the manipulation of the boom in the open area between the arms of the frame.

8. The lift truck according to claim 7 further comprising:

article receiving and supporting means mounted on the distal end of the boom; and means for maintaining a predetermined orientation of the article receiving and supporting means during manipulation of the boom under the action of the hydraulic cylinder means.

9. The lift truck acording to claim 8 wherein the article receiving and supporting means is adapted to receive and support an aerial weapon and comprises means for permitting selective rotation of the weapon relative to the boom about three mutually perpendicular axes.

10. A lift truck comprising:

a frame including a forward U-shaped portion comprising a pair of substantially parallel, longitudinally extending arms and a transversely extending base interconnecting the rear ends of the arms;

a pair of non-driven steering wheels mounted at the front ends of the arms of the U-shaped portion of the frame for supporting the front end of the lift truck;

a linkage including portions extending along the arms and a portion extending along the base of the U-shaped portion of the frame for maintaining the steering wheels in a parallel relationship with respect to the frame;

the U-shaped portion of the frame, the front steering wheels, and the linkage thereby defining an entirely opened area between the arms of the U-shaped portion of the frame;

a boom pivotally supported on the base of the U-shaped portion of the frame for vertical manipulation in said open area;

a prime mover mounted on the frame to the rear of the base of the U-shaped portion thereof;

transmission means operatively connected to the prime mover;

a pair of non-steerable drive wheels operatively connected to the transmission means and hence to the prime mover for actuation thereby to propel the vehicle, and an operating compartment positioned on the frame to the rear of the base of the U-shaped portion thereof and including means for manipulating the linkage to control the orientation of the front steering wheels.

11. The lift truck according to claim 10 further comprising;

hydraulic pump means driven by the prime mover for supplying hydraulic fluid under pressure;

hydraulic cylinder means connected between the frame and the boom for manipulating the boom in the open area between the arms of the U-shaped portion of the frame, and valve means mounted in the operating compartment for controlling the flow of hydraulic fluid from the hydraulic pump means to the hydraulic cylinder means and thereby controlling the manipulation of the boom.

12. The lift truck according to claim 11 further including:

hydraulic cylinder means connected between the linkage and the frame; and valve means mounted in the operating compartment for controlling the flow of hydraulic fluid from the hydraulic pump means to the hydraulic cylinder means and thereby controlling the orientation of the front steering wheels.

13. The lift truck according to claim 12 further comprising:

article receiving and supporting means mounted on the distal end of the boom; and means for maintaining a predetermined orientation of the article and receiving and supporting means during manipulation of the boom in the open area between the arms of the U-shaped portion of the frame.

* * * * *